United States Patent
Popov et al.

(10) Patent No.: US 11,276,431 B1
(45) Date of Patent: Mar. 15, 2022

(54) DATA STORAGE DEVICE EXECUTING JUST-IN-TIME REFRESH

(71) Applicant: Western Digital Technologies, Inc., San Jose, CA (US)

(72) Inventors: Zarko Popov, Mission Viejo, CA (US); Shad H. Thorstenson, Rochester, MN (US); Andrew E. Larson, Rochester, MN (US); Gregory M. Frees, Los Altos, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/204,277

(22) Filed: Mar. 17, 2021

(51) Int. Cl.
G11B 20/18 (2006.01)
G11B 19/04 (2006.01)
G11B 5/55 (2006.01)
G11B 5/012 (2006.01)

(52) U.S. Cl.
CPC ............ *G11B 19/044* (2013.01); *G11B 5/012* (2013.01); *G11B 5/5539* (2013.01)

(58) Field of Classification Search
CPC .............. G11B 20/10; G11B 27/36; G11B 2020/10898; G11B 2220/90; G11B 20/10009; G11B 27/3027; G11B 20/18; G06F 3/0619; G06F 3/0653; G06F 3/0659; G06F 3/0676; G06F 12/00

USPC .............. 360/77.01, 75, 31, 39, 48, 53, 72.2
See application file for complete search history.

(56) References Cited

U.S. PATENT DOCUMENTS

| 6,854,022 | B1 | 2/2005 | Thelin | |
|---|---|---|---|---|
| 7,174,478 | B2* | 2/2007 | Asano | G11B 19/04 710/5 |
| 7,870,460 | B2* | 1/2011 | Iketaki | G11B 5/09 714/754 |
| 8,174,780 | B1* | 5/2012 | Tsai | G11B 27/36 360/31 |
| 9,269,393 | B1* | 2/2016 | Webb | G11B 20/10009 |
| 10,379,760 | B1* | 8/2019 | Hall | G06F 3/0653 |

* cited by examiner

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a magnetic media comprising a plurality of data tracks, wherein each data track comprises a plurality of data sectors. A plurality of access commands are stored in a command queue, and an access command is selected from the command queue. When the selected access command is a write command to a target data track and at least part of a first data track proximate the target data track needs to be refreshed, a refresh read command is executed to read data from at least part of the first data track prior to executing the write command to the target data track.

20 Claims, 4 Drawing Sheets

DATA STORAGE DEVICE EXECUTING JUST-IN-TIME REFRESH

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

DETAILED DESCRIPTION

Figure 1:
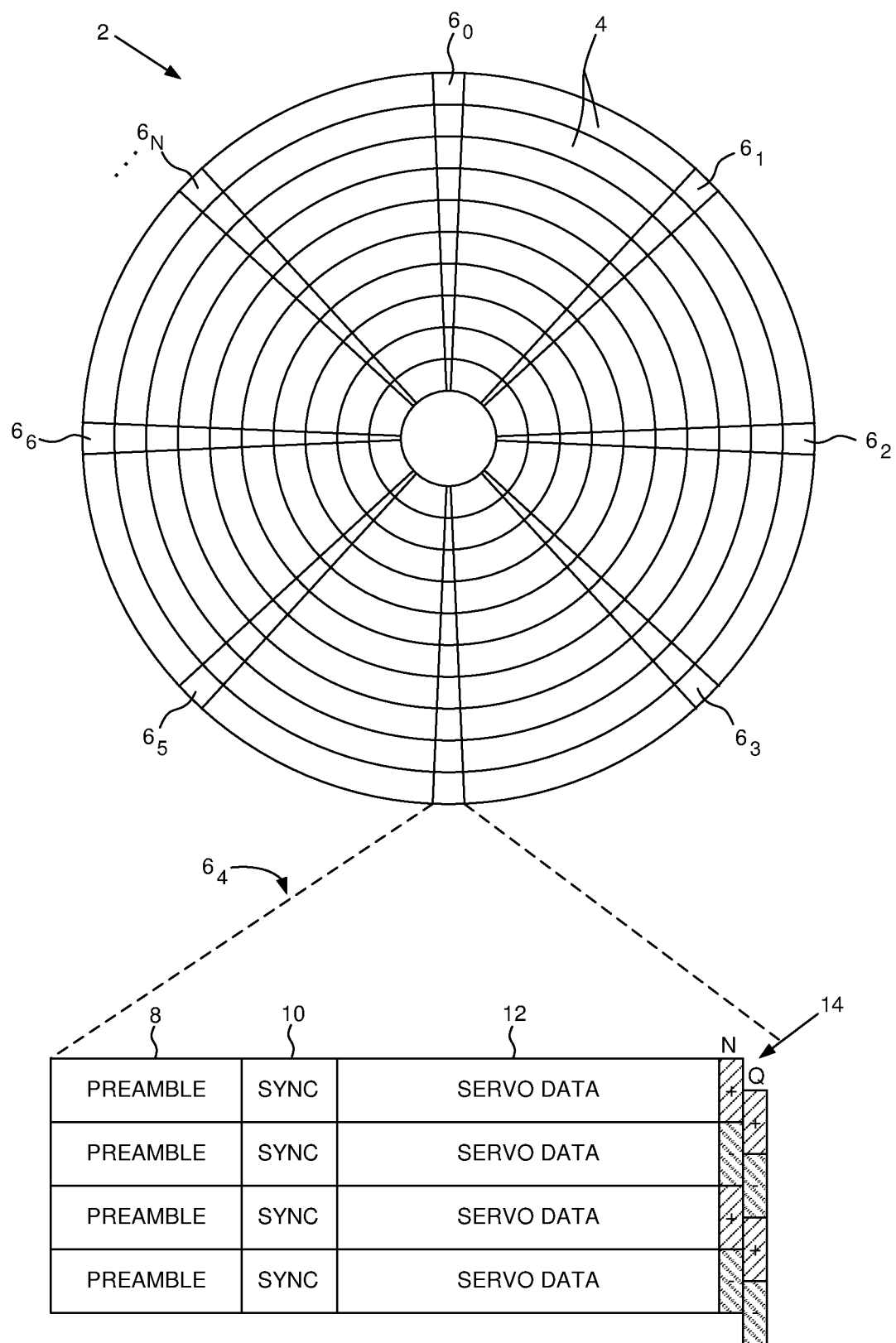
FIG. 1 shows a prior art disk format comprising a plurality of servo tracks defined by servo sectors.
Figure 2A:
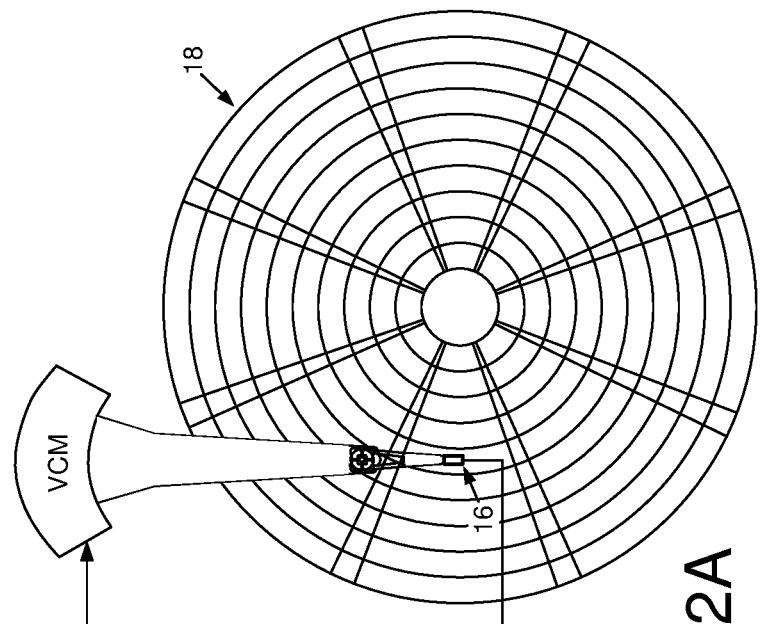
FIG. 2A shows a data storage device in the form of a disk drive according to an embodiment comprising a head actuated over a disk comprising a plurality of data tracks, wherein each data track comprises a plurality of data sectors.

FIG. 2A shows a data storage device in the form of a disk drive according to an embodiment comprising a head 16 actuated over a disk 18 comprising a plurality of data tracks, wherein each data track comprises a plurality of data sectors. While a disk drive is used as an illustrative example herein, various embodiments of the invention may be applied to, and/or include, other types of data storage device with magnetic media such as tape drives. The disk drive further comprises control circuitry 20 configured to execute the flow diagram of FIG. 2B, wherein a refresh monitor is maintained for a refresh zone comprising at least one of the data sectors (block 22). A plurality of access commands are stored in a command queue (block 24), and an access command is selected from the command queue for execution (block 26). When the selected access command is a write command to a target data track and the refresh monitor indicates a first data track proximate the target data track needs to be refreshed (block 30), a refresh read command is executed to read data from the first data track (block 30) prior to executing the write command to the target data track (block 32).

Figure 3:
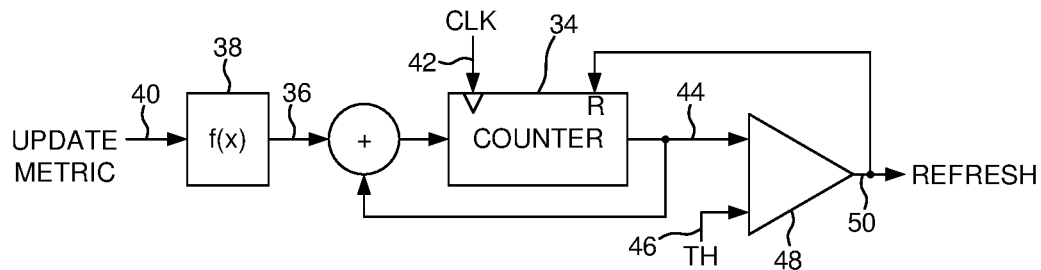
FIG. 3 shows an example refresh monitor comprising an update function for updating a refresh counter.

FIG. 3 shows an example refresh monitor comprising a counter 34 that represents a degree of data degradation within a corresponding refresh zone. At the beginning of a refresh interval, the counter 34 is reset to zero and then periodically incremented during the refresh interval by an update value 36 generated by an update function 38. The update function 38 generates the update value 36 as a function of one or more refresh parameters 40 that affect degradation of the data during the refresh interval. Examples of refresh parameters 40 that affect data degradation include adjacent (or near adjacent) track interference (ATI) caused by writing to a proximate data track, pre-biasing a write assist element (e.g., laser or STO) prior to a write command, general degradation that occurs over time, environmental conditions such as temperature and altitude, etc. The counter 34 in FIG. 3 is updated by a clock 42 that may cycle at a fixed frequency and/or cycle each time there is an event affecting data degradation (e.g., a write command). The output 44 of the counter 34 is compared to a refresh threshold 46 at compactor 48 which asserts a refresh signal 50 when the output 44 exceeds the refresh threshold 46. FIG. 3 provides a general overview of a refresh monitor, whereas the actual implementation may comprise components other than a literal counter (e.g., using a general accumulator implemented in software or hardware). In addition, the refresh monitor may operate based on a number of different update functions depending on the refresh parameters being monitored, and/or using a number of different refresh thresholds each corresponding to a different level of refresh urgency.

In one embodiment, the update function 38 may compute an estimated degree of data degradation caused by a given event, such as an estimated degree of data degradation due to adjacent track interference when executing a write command to an adjacent (or near adjacent) data track. The estimated degree of data degradation is then used to increment the refresh counter 34 by a corresponding increment. The update function 38 may estimate the degree of data degradation for any given event using any suitable technique, such as with a linear function (e.g., a polynomial) or a non-linear function (e.g., a lookup table).

Figure 4A:
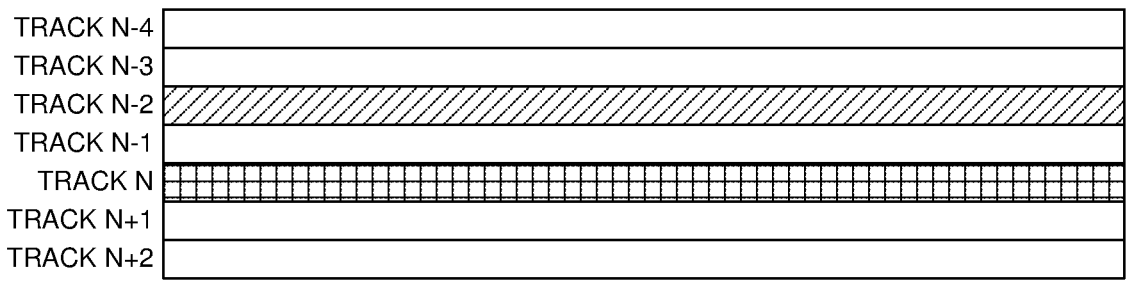
FIG. 4A shows an example wherein a refresh read of data track N−2 is executed prior to executing a write command to data track N.

The refresh monitor such as shown in FIG. 3 may track the data degradation of any size refresh zone, such as a data sector, a data track, or a band of data tracks. In an example embodiment shown in FIG. 4A, each refresh zone consists of a single data track, wherein a data track may be refreshed by reading the data from the data track and then rewriting the data (to the same or different data track). In the example of FIG. 4A, the data degradation of data track N–2 has reached the level where the corresponding refresh monitor indicates the need to refresh the data track. In one embodiment, the refresh read of data track N–2 is deferred (rather than executed with immediacy) while waiting to see if a write command is executed to a proximate data track that will cause excessive data degradation to data track N–2. While data track N–2 is waiting to be refreshed, the disk drive may execute a read command (e.g., a host read command) to read data track N–2 as part of the normal operation of the disk drive, thereby obviating the need for the refresh read. Another event that may obviate the refresh read of data track N–2 is a write command to data track N–2 (e.g., a host write command) which overwrites the previously written data. In this manner, the refresh of data track N–2 is deferred to be "just-in-time" since the refresh read is executed just before the ATI of a proximate write command may render the data track unrecoverable.

Figure 4B:
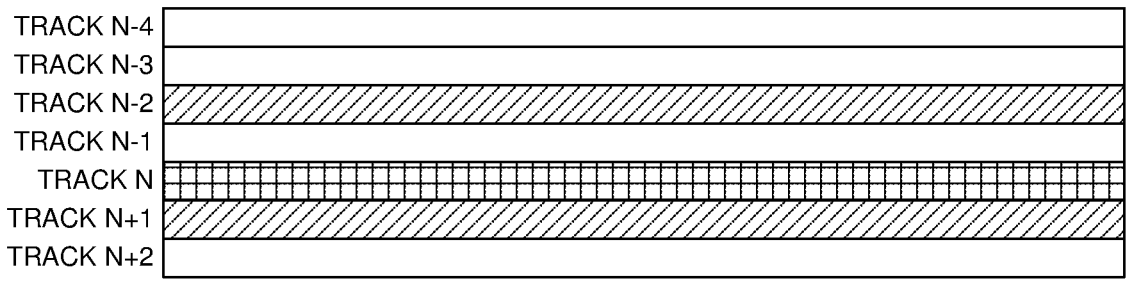
FIG. 4B shows an example wherein a refresh read of data track N−2 and data track N+1 are executed prior to executing a write command to data track N.

In one embodiment, the control circuitry 20 of FIG. 2A stores a plurality of access commands (e.g., host or system commands) in a command queue, and then prioritizes the execution order of the queued access commands based on any suitable sort algorithm, such as a rotational position optimization (RPO) algorithm which sorts the access commands into an execution order that minimizes an access latency (e.g., seek and rotation latency). Accordingly in this embodiment, the timing of write commands (e.g., write commands received from the host) may be unknown since the execution order may be repeatedly updated as new access commands are inserted into the command queue. Referring again to the example of FIG. 4A, there may be a write command to data track N that is queued in the command queue which may render data track N–2 unrecoverable if executed prior to the refresh read of data track N–2. However since the execution time of the write command is somewhat arbitrary, in one embodiment the refresh read of data track N–2 may be deferred until the write command to data track N is actually selected from the command queue for execution. When the write command is selected for execution, the control circuitry first executes a refresh read of data track N–2 prior to executing the write command to data track N, thereby avoiding the possibility that the write command will render data track N–2 unrecoverable. FIG. 4B shows an embodiment wherein there may be two or more data tracks (e.g., data track N–2 and data track N+1) that have reached their refresh threshold for which a refresh read is first executed prior to executing a write command to data track N.

In one embodiment, a refresh zone may consist of a segment of a data track (e.g., one or more consecutive data sectors), wherein a refresh read of a refresh zone may precede a write command when there are overlapping data sectors. For example, when writing to only part of data track N in FIG. 4A, the control circuitry may first execute a refresh read of the corresponding refresh zones in data track N–2 that overlap with the data sectors being written in data track N.

Figure 2B:
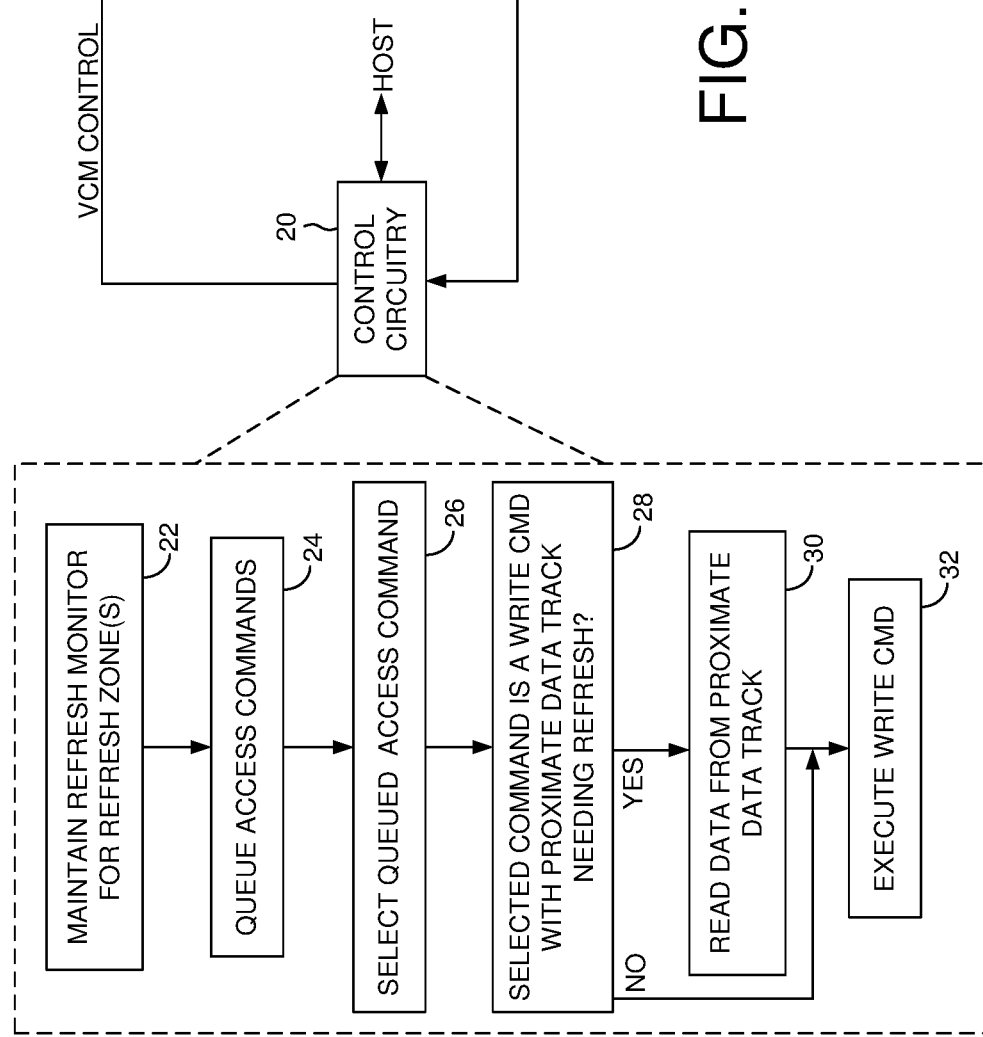
FIG. 2B is a flow diagram according to an embodiment wherein when executing a write command to a target data track, at least one data sector in an adjacent (or near adjacent) data track that needs refreshing is read prior to executing the write command.
Figure 5:
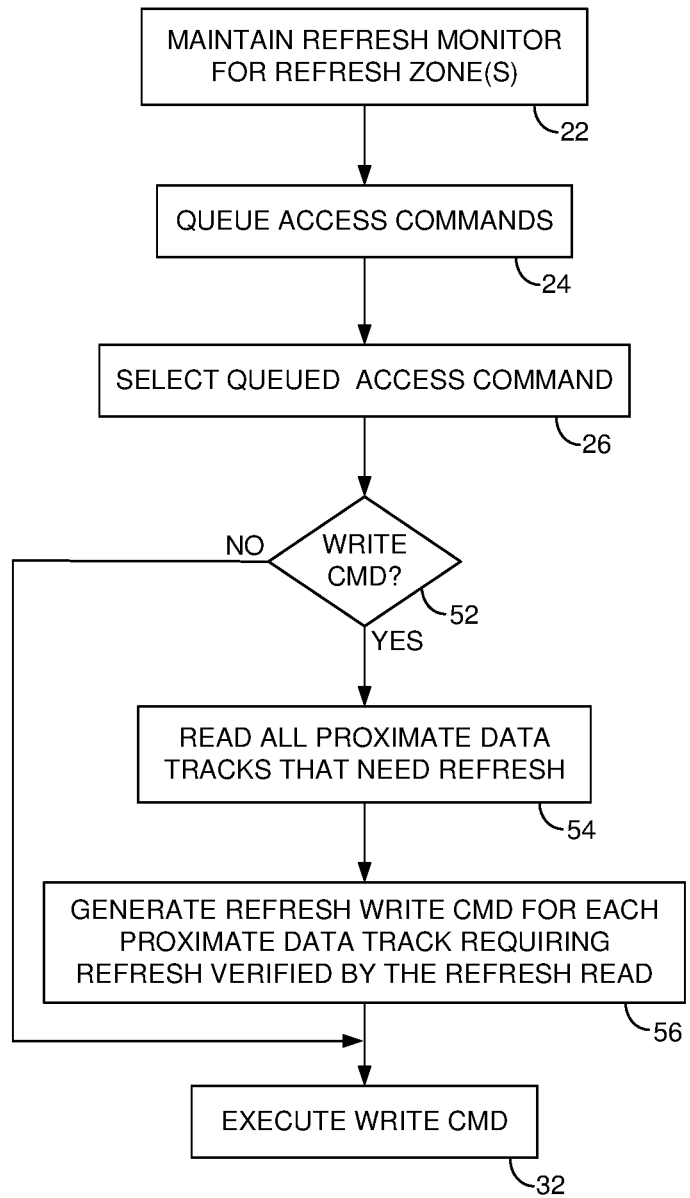
FIG. 5 is a flow diagram according to an embodiment wherein after executing a refresh read of a proximate data track, a refresh write command is generated when verified by the refresh read.

FIG. 5 is a flow diagram according to an embodiment which extends on the flow diagram of FIG. 2B, wherein when a write command is selected for execution from the command queue (block 52), a refresh read of at least part of the proximate data tracks is first executed for the refresh zones that have reached their refresh threshold (block 54) as described above. In one embodiment, during the refresh read the control circuitry 20 may measure the actual integrity of the recorded data, for example, by evaluating a quality of the read signal, a number of bit errors detected, a depth of an error recovery procedure needed to recover the data, etc., as a prerequisite to generating a refresh write command (block 56). In other words, in one embodiment when executing a refresh read the control circuitry 20 verifies that the recorded data has degraded to a level that warrants a data refresh before generating a corresponding refresh write. In one embodiment when the control circuitry 20 determines the data stored in the refresh zone is still sufficiently recoverable, the control circuitry 20 may adjust the refresh counter (e.g., by decrementing the counter 34 in FIG. 3) in order to further defer the fresh operation. In one embodiment, the adjustment to the refresh monitor may be proportional the level of degradation measured during the refresh read (e.g., by decrementing the counter 34 proportional to the measured quality of the recorded data).

In one embodiment, when the control circuitry 20 executes a refresh read and verifies a refresh zone needs refreshing at block 56, the refresh write command may be executed immediately following the refresh read command. Referring again to the example of FIG. 4A, the control circuitry 20 may execute a refresh read of data track N–2 and then execute a refresh write of data track N–2 prior to executing the write command to data track N. In an alternative embodiment, the control circuitry 20 may defer execution of the refresh write, such as deferring the refresh write until the disk drive enters an idle mode. In one embodiment, the control circuitry 20 may insert the refresh write commands into the command queue so that the refresh write commands are executed together with the other queued access commands based on any suitable sort algorithm (e.g., RPO algorithm).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a magnetic media comprising a plurality of data tracks, wherein each data track comprises a plurality of data sectors;
   a head actuated over the magnetic media; and
   control circuitry configured to:
   maintain a refresh monitor for a refresh zone of the magnetic media, wherein the refresh zone comprises at least one of the data sectors;
   store a plurality of access commands in a command queue;
   select an access command from the command queue; and
   when the selected access command is a write command to a target data track and the refresh monitor indicates a first data track proximate the target data track needs to be refreshed, execute a refresh read command to read data from the first data track prior to executing the write command to the target data track, wherein the first data track is proximate to the target data track when the first data track is within ten data tracks of the target data track.

2. The data storage device as recited in claim 1, wherein the refresh monitor tracks data degradation of the first data track over a refresh interval.

3. The data storage device as recited in claim 2, wherein writing data to the target data track causes data degradation of the first data track.

4. A data storage device comprising:
   a magnetic media comprising a plurality of data tracks, wherein each data track comprises a plurality of data sectors;
   a head actuated over the magnetic media; and
   control circuitry configured to:
   maintain a refresh monitor for a refresh zone of the magnetic media, wherein the refresh zone comprises at least one of the data sectors;
   store a plurality of access commands in a command queue;
   select an access command from the command queue; and
   when the selected access command is a write command to a target data track and the refresh monitor indicates a first data track proximate the target data track needs to be refreshed, execute a refresh read command to read data from the first data track prior to executing the write command to the target data track,
   wherein the refresh monitor tracks data degradation of the first data track over a refresh interval,
   wherein writing data to the target data track causes data degradation of the first data track, and
   wherein when the refresh read indicates the write command may render data in the first data track unrecoverable, the control circuitry is further configured to generate a refresh write command for the first data track.

5. The data storage device as recited in claim 4, wherein the control circuitry is further configured to store the refresh write command in the command queue.

6. The data storage device as recited in claim 5, wherein the control circuitry is further configured to execute the refresh write command after executing the write command to the target data track.

7. The data storage device as recited in claim 1, wherein the first data track is adjacent the target data track.

8. The data storage device as recited in claim 1, wherein when the refresh monitor indicates a second data track proximate the target data track needs to be refreshed, the control circuitry is further configured to execute a refresh read command to read data from the second data track prior to executing the write command to the target data track.

9. A data storage device comprising:
- a magnetic media comprising a plurality of data tracks, wherein each data track comprises a plurality of data sectors;
- a head actuated over the magnetic media; and
- control circuitry configured to:
    - store a plurality of access commands in a command queue;
    - select an access command from the command queue;
    - when the selected access command is a write command to a target data track and at least part of a first data track proximate the target data track needs to be refreshed, execute a refresh read command to read data from at least part of the first data track prior to executing the write command to the target data track; and
    - when at least part of a second data track proximate the target data track needs to be refreshed, execute a refresh read command to read data from at least part of the second data track prior to executing the write command to the target data track.

10. The data storage device as recited in claim 9, wherein a refresh monitor tracks data degradation of the first data track over a refresh interval.

11. The data storage device as recited in claim 10, wherein writing data to the target data track causes data degradation of the first data track.

12. The data storage device as recited in claim 11, wherein when the refresh read indicates the write command may render data in the first data track unrecoverable, the control circuitry is further configured to generate a refresh write command for the first data track.

13. The data storage device as recited in claim 12, wherein the control circuitry is further configured to store the refresh write command in a command queue.

14. The data storage device as recited in claim 13, wherein the control circuitry is further configured to execute the refresh write command after executing the write command to the target data track.

15. The data storage device as recited in claim 9, wherein the first data track is adjacent the target data track.

16. The data storage device as recited in claim 9, wherein the first data track is proximate to the target data track when the first data track is within ten data tracks of the target data track.

17. A data storage device comprising:
- a magnetic media comprising a plurality of data tracks, wherein each data track comprises a plurality of data sectors;
- a head actuated over the magnetic media;
- a means for storing a plurality of access commands in a command queue;
- a means for selecting an access command from the command queue;
- when the selected access command is a write command to a target data track and at least part of a first data track proximate the target data track needs to be refreshed, a means for executing a refresh read command to read data from at least part of the first data track prior to executing the write command to the target data track; and
- when at least part of a second data track proximate the target data track needs to be refreshed, a means for executing a refresh read command to read data from at least part of the second data track prior to executing the write command to the target data track.

18. The data storage device as recited in claim 17, wherein writing data to the target data track causes data degradation of the first data track.

19. The data storage device as recited in claim 17, wherein the first data track is proximate to the target data track when the first data track is within ten data tracks of the target data track.

20. The data storage device as recited in claim 17, further comprising:
- a means for tracking data degradation of the first data track over a refresh interval, wherein writing data to the target data track causes data degradation of the first data track; and
- when the refresh read indicates the write command may render data in the first data track unrecoverable, a means for generating a refresh write command for the first data track.

* * * * *